United States Patent [19]
Kato

[11] Patent Number: 6,148,031
[45] Date of Patent: Nov. 14, 2000

[54] IMAGE PROCESSING APPARATUS AND METHOD

[75] Inventor: Masatake Kato, Kunitachi, Japan

[73] Assignee: Canon Kabushiki Kaisha, Tokyo, Japan

[21] Appl. No.: 08/979,962

[22] Filed: Nov. 26, 1997

[30]    Foreign Application Priority Data

Nov. 27, 1996  [JP]  Japan ................................ 8-315856

[51] Int. Cl.[7] ................................ H04N 7/36; H04N 7/50
[52] U.S. Cl. ................ 375/240.13; 348/220; 375/240.26; 386/52
[58] Field of Search ................ 375/240, 240.13, 375/240.26; 348/409, 220; 386/52; H04N 7/36, 7/50

[56]    References Cited

U.S. PATENT DOCUMENTS

5,444,482  8/1995  Misawa ................................ 348/220

*Primary Examiner*—Howard Britton
*Attorney, Agent, or Firm*—Fitzpatrick, Cella, Harper and Scinto

[57]    ABSTRACT

An image processing apparatus and method for inputting image data and coding the image data using inter-frame correlation in which image data of a desired frame out of the image data input is intra-frame coded. The image processing apparatus includes an imaging block, a coding block for coding the image data imaged by the imaging block using inter-frame correlation, a command block for activating still image taking, and a control block for controlling the coding block so that the still image data obtained by the command block is intra-frame coded.

14 Claims, 7 Drawing Sheets

TIME

IMAGE PROCESSING APPARATUS AND METHOD

BACKGROUND OF THE INVENTION

1. Field of the Invention

The present invention relates to an image processing apparatus and method and, more particularly, to a coding process of moving picture data and still picture data.

2. Description of the Related Art

Electronic still cameras have been studied and commercialized which digitally record a picture on a recording medium such as a semiconductor memory, a magnetic disk, and a magneto-optic disk rather than on a silver film.

If a recording medium is randomly accessible, the pictures recorded are reproduced in an order different from the order of recording, and any recorded picture will be quickly reproduced. A digitally recorded picture is free from degradation in its repeated dubbing operation, and presents scalability along the time axis. The digitally recorded picture, however, requires a large quantity of data compared with its analog counterpart.

As means for reducing the quantity of recorded data, information compression techniques will be useful. A diversity of methods have been proposed including JPEG (Joint Photographic Coding Experts Group) for still pictures and MPEG (Moving Picture Coding Experts Group) for moving pictures.

In the JPEG standard, a value in a spatial coordinate system is subjected to orthogonal transformation (discrete cosine transformation) to convert it into a value on a frequency coordinate, according to a unit of 8×8 pixels, and a transformation coefficient is quantized, and variable-length coded using Huffman coding. In this way, the quantity of data is compressed to approximately one-tenth, or less, of the original quantity. Since this process is a semi-decodable coding one, an input signal cannot be perfectly faithfully reproduced, but no problems are practically presented in image quality. To decompress the compressed information, the process in the compression steps is reversed.

Since a priority is placed on the quality of image in still picture taking, some degree of time-consuming postprocessing (including compression process and recording process to a recording medium) will be considered tolerable. In fast serial picture taking, however, the time interval between pictures is dependent on the time required for postprocessing; thus, the time required for compression process and recording process must be shortened or the postprocessing must be partly performed in a parallel fashion to reduce standby time for image pickup.

When a short-time moving picture is recorded, a frame rate of 30 frames/s (or 60 feet/s) or so is required to achieve a smooth motion of pictures.

To this end, the shortening of the time required for postprocessing is also necessary. Furthermore, it is also necessary to both increase the memory capacity of the recording medium and to heighten the image compression rate. To perform compression and recording on a real-time basis, the construction of the apparatus becomes complicated, and the recording medium has to feature a fast write capability.

The MPEG standard, the known compression technique for moving picture, increases the compression rate by adding time axis compression to the compression of each picture. More particularly, there is a high correlation between the frames subsequent to or prior to a reference picture (similar pixel information is derived therefrom) even if some motion is involved therebetween. Differentials from the reference picture values at the respective pixel addresses are determined and coded to further increase the effect of compression. Furthermore, an object to be compared is block matched between comparison frames on a block by block basis. The differential between frames is determined by shifting the object horizontally across pixels and vertically across lines by a distance depending on the motion of the object. The effect of compression is thus further increased.

Although the moving picture compression is thus accomplished to achieve a higher compression rate, the apparatus becomes more complex in construction and more costly accordingly.

As described above, the use of inter-frame correlation in addition to intra-frame compression is particularly important in the moving picture compression process to achieve a high compression rate among other things in connection with the recording of the moving picture.

The random access capability to digitally record a moving picture onto a recording medium in a random access fashion is useful because it also works during the reproduction of the moving picture. If the inter-frame compression is effected, however, the reference frame of a desired frame in inter-frame compression must be first decompressed to reproduce the desired frame, and this involves a complicated reproduction process. Furthermore, in case of a semi-decodable coding process, the image quality will be degraded.

A user may desire to record a high-definition still picture at a particular point in time during continuous recording. In the conventional art, the user cannot perform selective compression process to compress that particular picture at a particularly high-quality level.

SUMMARY OF THE INVENTION

It is an object of the present invention to provide an image processing apparatus and method, which reduce the quantity of coded data when image data is coded, and which reproduces at a high definition the picture of a frame a user desires.

To achieve this object, the image processing apparatus and method of the present invention, in one embodiment, input image data, and code the image data using inter-frame correlation while intra-frame coding the image data of a frame desired out of the input image data.

In another embodiment, the image processing apparatus of the present invention comprises imaging means, coding means using inter-frame correlation for coding the image data picked up by the imaging means, command means for activating still image taking, and control means for controlling the coding means so that the still image data obtained by the command means is intra-frame coded.

Other objects, features and advantages of the invention will become apparent from the following detailed description taken in conjunction with the accompanying drawings.

DETAILED DESCRIPTION OF THE PREFERRED EMBODIMENTS

Referring to the drawings, the embodiments of the present invention are now discussed.

Figure 1:
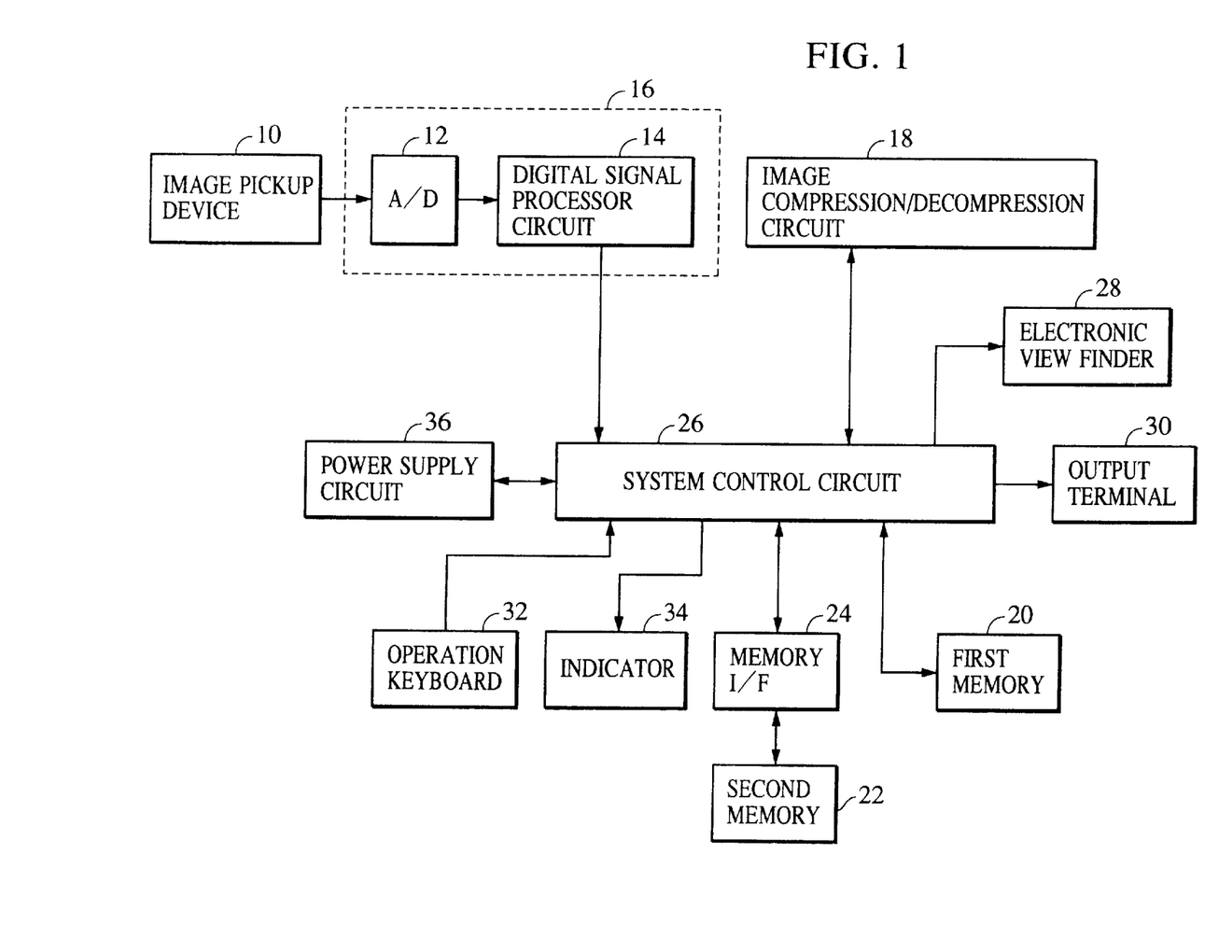
FIG. 1 is a block diagram showing an image processing apparatus of one embodiment of the present invention.

FIG. 1 is a block diagram showing an image processing apparatus of one embodiment of the present invention. There are shown a CCD (charge coupled device) image pickup device 10, an A/D converter 12 for converting an analog output from the CCD image pickup device 10 into a digital signal, and a digital signal processor circuit 14 for separating the output data from the A/D converter 12 into luminance data and color-difference data to generate component signals. The A/D converter 12 and digital signal processor circuit 14 are collectively called a camera signal processor circuit 16.

Also shown are an image compression/decompression circuit 18, a first memory 20 for storing temporarily initially compressed information of the image taken, a second memory 22 for storing finally the image information taken, and an interface 24 for the second memory 22.

There are further shown a system control circuit 26 for generally controlling the apparatus, an electronic view finder 28, an output terminal 30 for video/audio signals, an operation keyboard 32 provided with a trigger switch for continuous image taking and a trigger switch for still image taking, an indicator 34 for indicating a frame count for image taking and a remaining memory capacity in a recording memory, and a power supply circuit 36.

The operation of the embodiment shown in FIG. 1 is now discussed. When the operation keyboard 32 issues a continuous image taking command, the image compression/decompression circuit 18 compresses the output of the camera signal processor circuit 16 according to a motion JPEG standard (intra-picture coding), and the compressed information is stored in the first memory 20. When a still image taking request is input (through the operation keyboard 32, for example) during the continuous image taking, the system control circuit 26 tags with a still image taking flag the corresponding frame of the image information compressed according the motion JPEG standard, and stores them in the first memory 20.

Upon the end of the continuous image taking, the system control circuit 26 reads the series of still images from the first memory 20, re-compresses (inter-picture codes) them by the image compression/decompression circuit 18 while sequentially taking inter-frame correlation. Since the re-compression needs less real-time urgency than the image writing (to the first memory 20), it may be carried out under the control of software in the system control circuit 26. The re-compressed image information is written onto the second memory 22 via the interface 24.

The second memory 22 is a flash memory of a card type, for example, in this embodiment. Alternatively, the second memory 22 may be an optical disk, a magneto-optic disk, a hard disk or a magnetic disk.

When the series of still images are read from the first memory 20 to be sequentially re-compressed, they are inter-frame correlated and compressed while being buffered at an unshown frame memory. When a still image taking request flag is detected, the corresponding frame is transferred to the second memory 22 as an intra-picture independently of the main routine. The still image taking request flag may be set either during the continuous still image taking or during the re-compressed image writing to the second memory 22.

Figure 2:
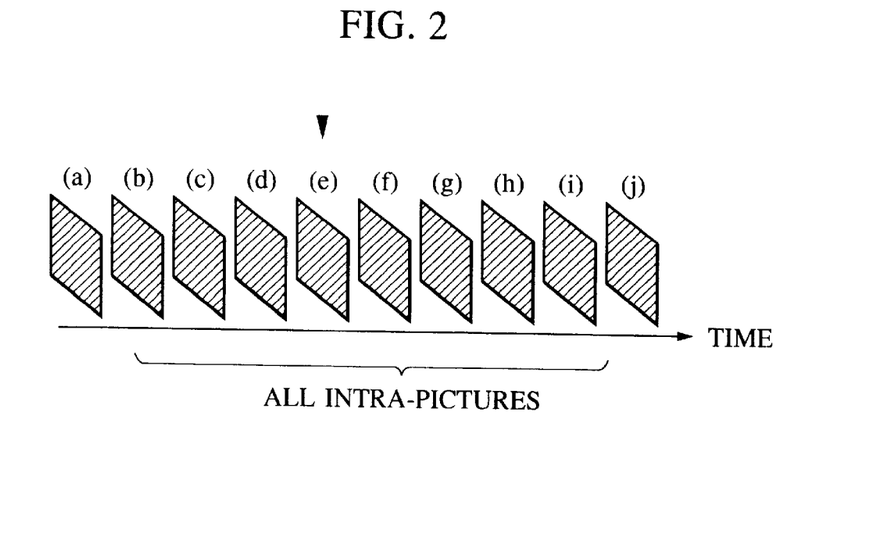
FIG. 2 shows, in a time-series fashion, image information stored in a first memory 20.
Figure 3:
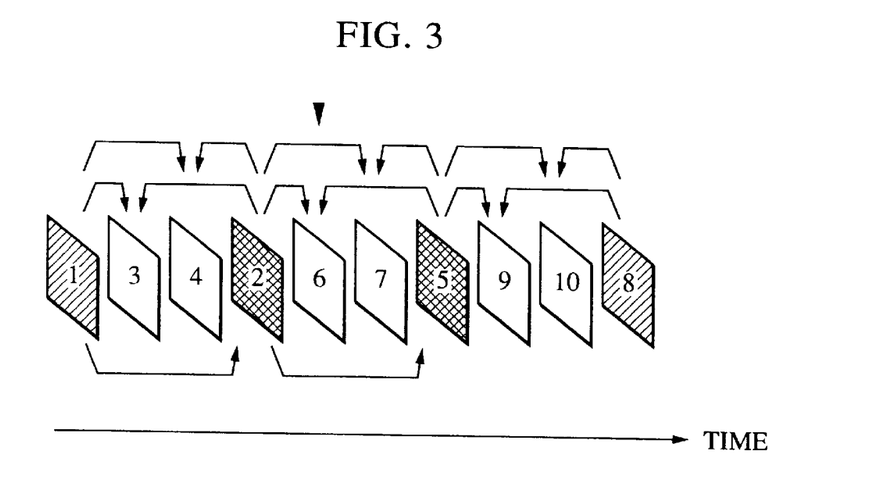
FIG. 3 shows, in a time-series fashion, compressed image information stored in a second memory 22.
Figure 4:
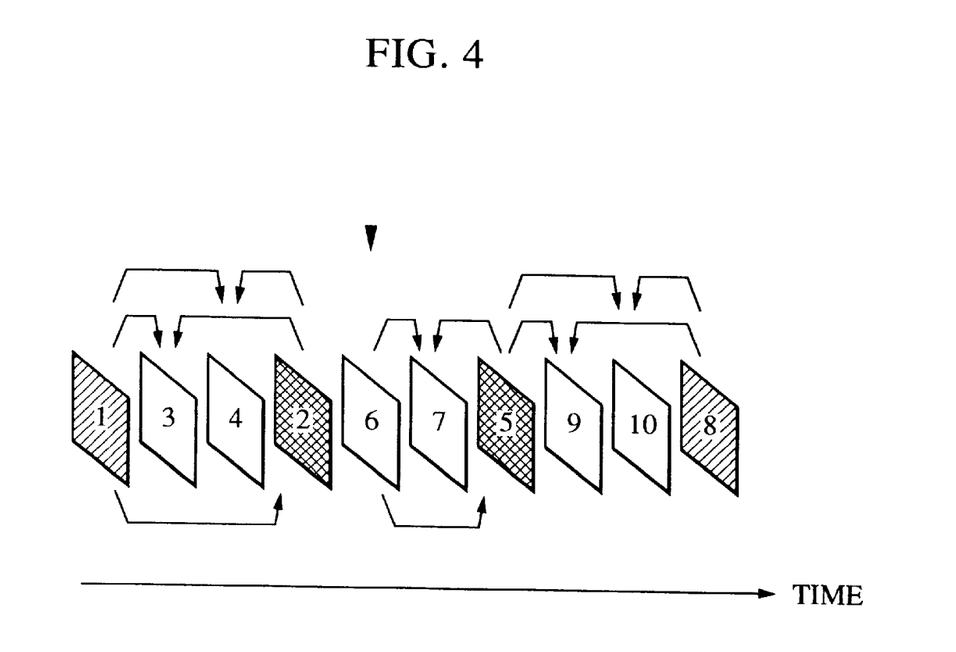
FIG. 4 shows, in a time-series fashion, compressed image information stored in the second memory 22 when a still image is requested.

The unique operation of this embodiment is now discussed referring to FIGS. 2, 3 and 4. FIGS. 2, 3 and 4 show the input image flow along the time axis. In the NATIONAL TELEVICION STANDARD CODE (NTSC) system, an image of 720×480 pixels or so is interlaced and written at a rate of 60 fields/s. The sampling frequency is 13.5 MHz, and the color-difference signals R-Y and B-Y are respectively 6.75 MHz. The color-difference signals are reduced by ½ to create component signals of 4:1:1, and are then subjected to compression. The signals are not only presented on a TV monitor, and may also be fed to a personal computer for a diversity of purposes, of which the above maximum pixel quantity and frame rate may not be required. For example, there are times when 320×240 pixels and a frame rate of 30 frames/s are sufficient. The moving picture at this level still needs a transfer rate of 18 Mbps at an 8-bit data writing without compression.

Referring to FIG. 2, each frame of the 4:1:1 component signals is JPEG compressed to $\frac{1}{10}$, resulting in about 12 Kbytes of image information per frame. The motion JPEG operation is performed by arranging the JPEG compressed still images continuously to be a moving picture. A data quantity of 0.4 Mbytes per second, 21 Mbytes per minute should be handled, and thus the number of images (time length) cannot be sufficiently increased. Since each frame is now intra-frame compressed image (intra-picture), a single frame only can be decompressed. Namely, a random reproduction is easily made. Although many types of recording media are available (such as a semiconductor memory, a magnetic disk, an optical disk, a hard disk, etc), there are none yet which meets all criteria including fast writing capability, compact design, large memory capacity and low cost. Such compressed image information is stored in the first memory 20.

As shown in FIG. 1, the intra-frame compressed image information is stored in the first memory 20 in this embodiment. After the end of picture taking or during the image writing to the first memory 20, inter-frame correlation is detected along the time axis, the detected correlation is used to re-compress the images along the time axis, and the resulting compressed information is stored in the second memory 22. FIG. 3 shows, in a time-series fashion, the compressed image information stored in the second memory 22. In this embodiment, the second memory 22 is the final storage medium. More memories may be used as necessary. FIG. 3 shows 10 frames only during moving picture taking. The number on each frame is the frame number denoting the order of process during recompression.

A first frame is an intra-picture, in which all block information is compressed within the frame. The first frame is considered as being the same as the frame (a) in FIG. 2. Although frames (b) and (c) in FIG. 2 are stored in the first memory 20, frame (d) is first compressed during re-compression. The frame (d) is differential coded relative to the first frame as a reference or criterion frame. When motion components in each block is few, simple differential values may be used. Motion compensation derived from motion vectors may be performed as necessary before compression coding.

Third and fourth frames are obtained by inter-frame correlating and compressing the frames (b) and (c) in FIG. 2 from both first and second frames. The arrows in FIG. 3 show the directions of reference in inter-frame compression.

Since FIG. 2 shows still images, one may naturally wonder why a still image taking request is particularly needed. A still image taking request may be generated during the continuous image taking, for example, at the moment of a strobe flashing for a still image taking. There will be times when the user may want to sequentially access only the frames associated with the still image taking request during the reproduction stage later, or when the user may want to print the frames by designating the frame number.

Suppose that the frame (e) in FIG. 2 is a still image frame designated by the user. Since the sixth frame in FIG. 3 corresponding to the frame (e) in FIG. 2 is not an intra-picture, a later attempt to decompress and reproduce individually the sixth frame only in response to a still image reproduction request will fail.

As shown in FIG. 4, to cope with such a situation, this embodiment keeps frames, tagged with still image request during the continuous image taking, from inter-frame correlation and compression during the re-compression process, thereby leaving intra-picture information intact in these frames from their input time. These frames are individually decompressed, and then reproduced. The header information, except the image information, may be modified to a file format appropriate to the moving picture or still picture.

The construction and operation of the image compression/decompression circuit 18 are now discussed.

Figure 5:
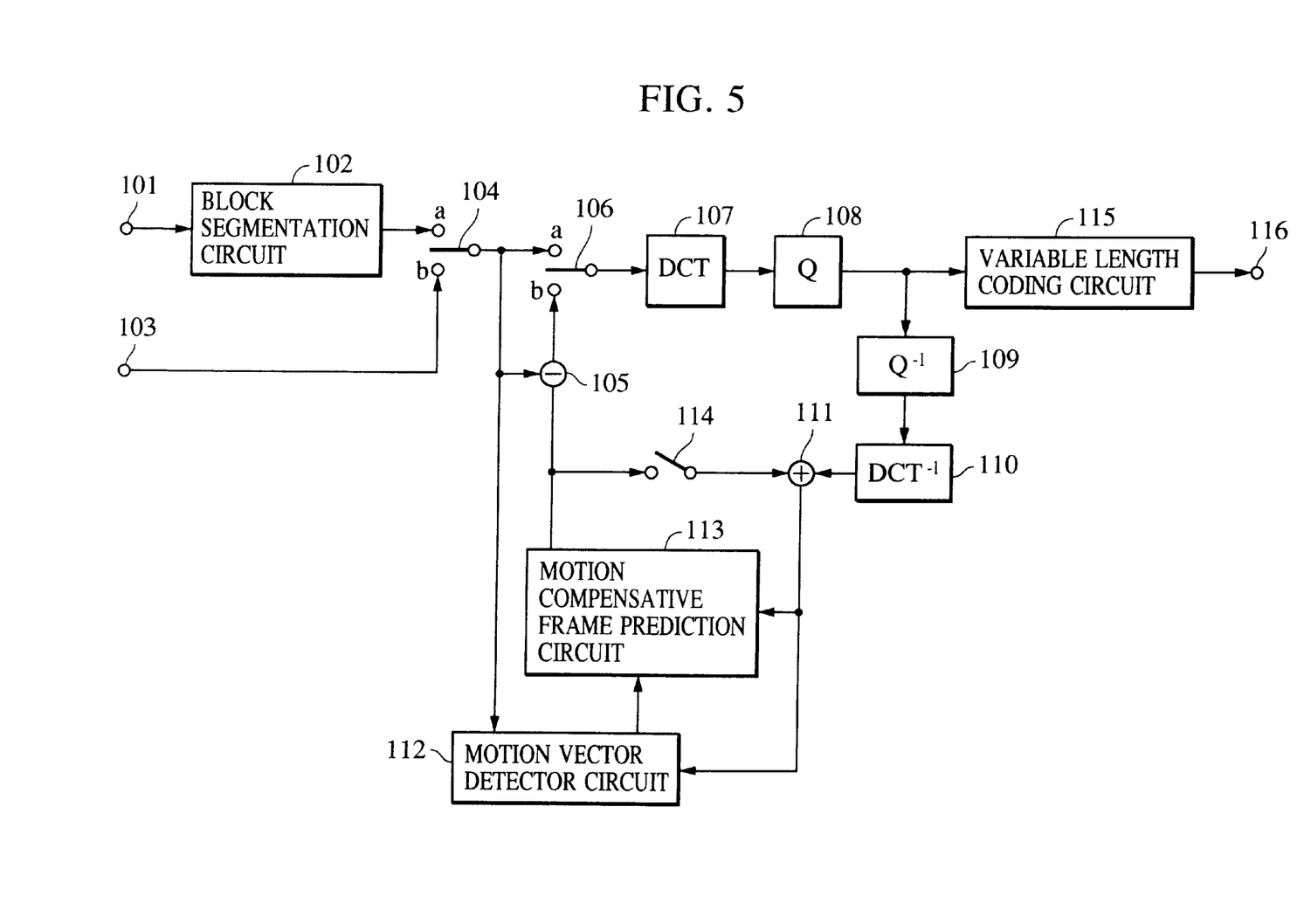
FIG. 5 is a block diagram of a circuit arrangement of an image compression/decompression circuit 18 that performs an image compression process.

FIG. 5 is a block diagram of a circuit arrangement of the image compression/decompression circuit 18 that performs an image compression process.

Shown in FIG. 5 are an input terminal 101 for receiving the image data processed by the digital signal processor circuit 14, and a block segmentation circuit 102 for segmenting the image data input via the input terminal 101 into blocks, each constructed of 8 rows and 8 columns of pixels.

An input terminal 103 receives the image data which is read from the first memory 20 and then decoded.

A switch 104 selects between the output from the block segmentation circuit 102 and the output at the input terminal 103. The switch 104, controlled by the system control circuit 26, makes the connection to the contact point b when the image data is re-compressed and makes the connection to the contact point a for the rest of the time.

A subtracter 105 subtracts a predicted value from the output of the switch 104, and a switch 106 selects between the output from the switch 104 and the output from the subtracter 105. The switch 106 makes the connection to the contact point a during the intra-frame coding, and makes the connection to the contact point b during the inter-frame prediction coding. The switch 106 is controlled by the system control circuit 26.

A discrete cosine transformation (DCT) circuit 107 transforms the data selected by the switch 106 to frequency domain, and a quantizing circuit 108 quantizes the output (a frequency coefficient) from the DCT circuit 107 in quantization steps of each frequency coefficient.

An inverse quantizing circuit 109 inverse-quantizes the output of the quantizing circuit 108. An inverse DCT circuit 110 transforms the output of the inverse quantizing circuit 109 to time domain. An adder 111 adds 0 to the output of the inverse DCT circuit 110 during the intra-frame coding, and adds the predicted value to the output of the inverse DCT circuit 110 during the inter-frame prediction coding. The output of the adder 111 is a local decoded value for the intra-frame coding or inter-frame prediction coding.

A motion vector detector circuit 112 detects the motion of the picture. A motion compensative frame prediction circuit 113 motion-compensates for the output of the adder 111 based on the detected value of the motion vector detector circuit 112, and the output of the motion compensative frame prediction circuit 113 is the predicted value.

A switch 114 is opened during the intra-frame coding, and is closed during the inter-frame prediction coding. The switch 114 is also controlled by the system control circuit 26.

The predicted value output by the motion compensative frame prediction circuit 113 is applied to the subtracter 105 while being also applied to the adder 111 via the switch 114.

A variable length coding circuit 115 variable-length codes the output of the quantizing circuit 108. The output of the variable length coding circuit 115 is provided at an output terminal 116.

Figure 6:
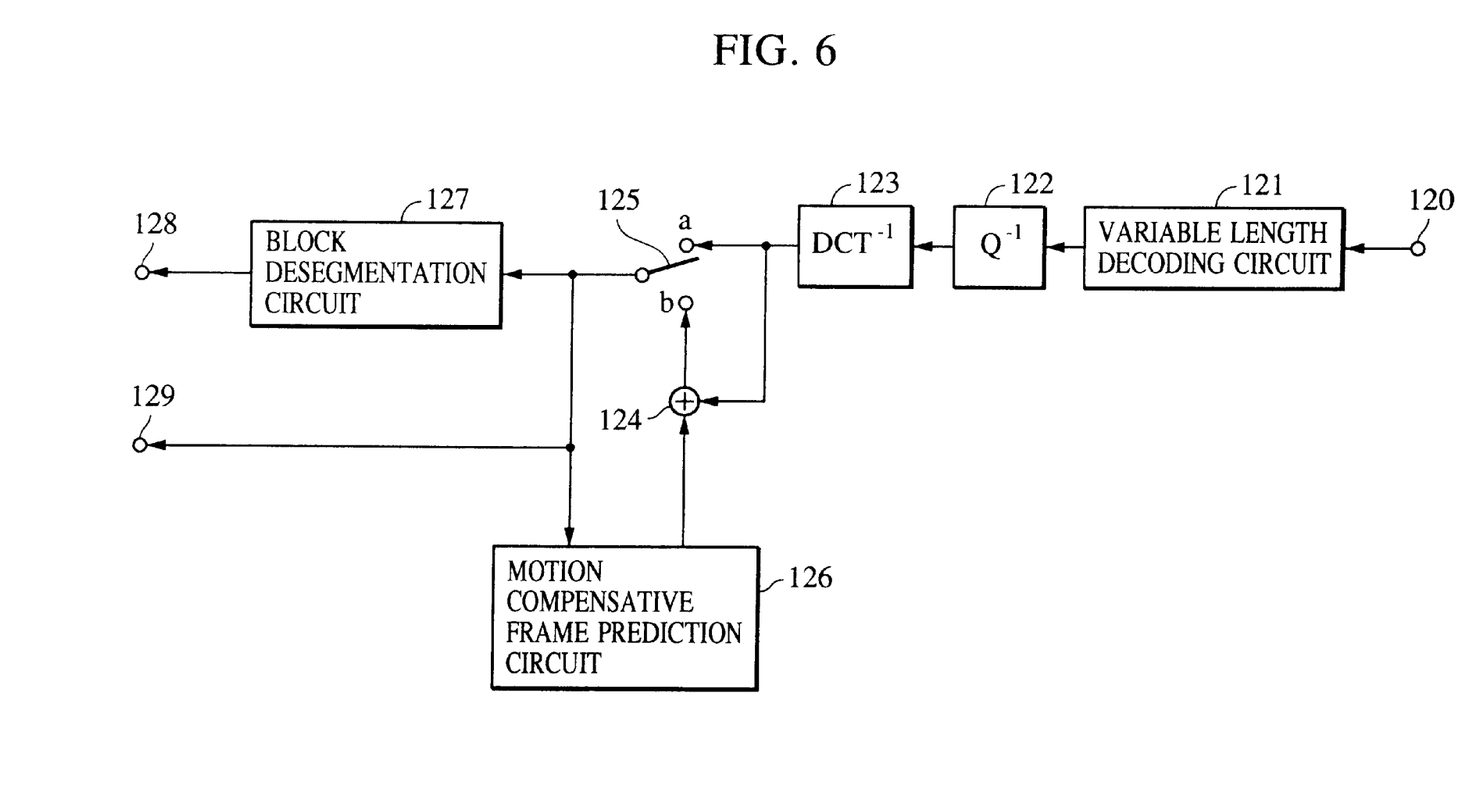
FIG. 6 is a block diagram of a circuit arrangement of the image compression/decompression circuit 18 that performs an image decompression process.

FIG. 6 is a block diagram of a circuit arrangement of the image compression/decompression circuit 18 that performs an image decompression process.

Shown in FIG. 6 are an input terminal 120 for receiving coded data, a variable length decoding circuit 121 for variable-length decoding the coded data received by the input terminal 120, an inverse quantizing circuit 122 for inverse-quantizing the output of the variable length decoding circuit 121, and an inverse DCT circuit 123 for inverse-DCT transforming the output of the inverse quantizing circuit 122.

An adder 124 adds a predicted value to the output of the inverse DCT circuit 123, and a switch 125 selects between the output of the inverse DCT circuit 123 and the output of the adder 124. The switch 125, controlled by the system control circuit 26, makes the connection to the contact point a during the intra-frame coding, and makes the connection to the contact point b during the inter-frame coding.

A motion compensative frame prediction circuit 126 computes a motion compensative frame predicted value of reproduction image data selected by the switch 125. The motion compensative frame prediction circuit 113 for the coding system is also used as the motion compensative frame prediction circuit 126.

Further shown in FIG. 6 are a block desegmentation circuit 127 for returning the reproduction image data selected by the switch 125 into raster scanning format, an output terminal 128 for presenting the reproduction image data output by the block desegmentation circuit 127, and an output terminal 129 for presenting the reproduction image data selected by the switch 125.

Figure 7:
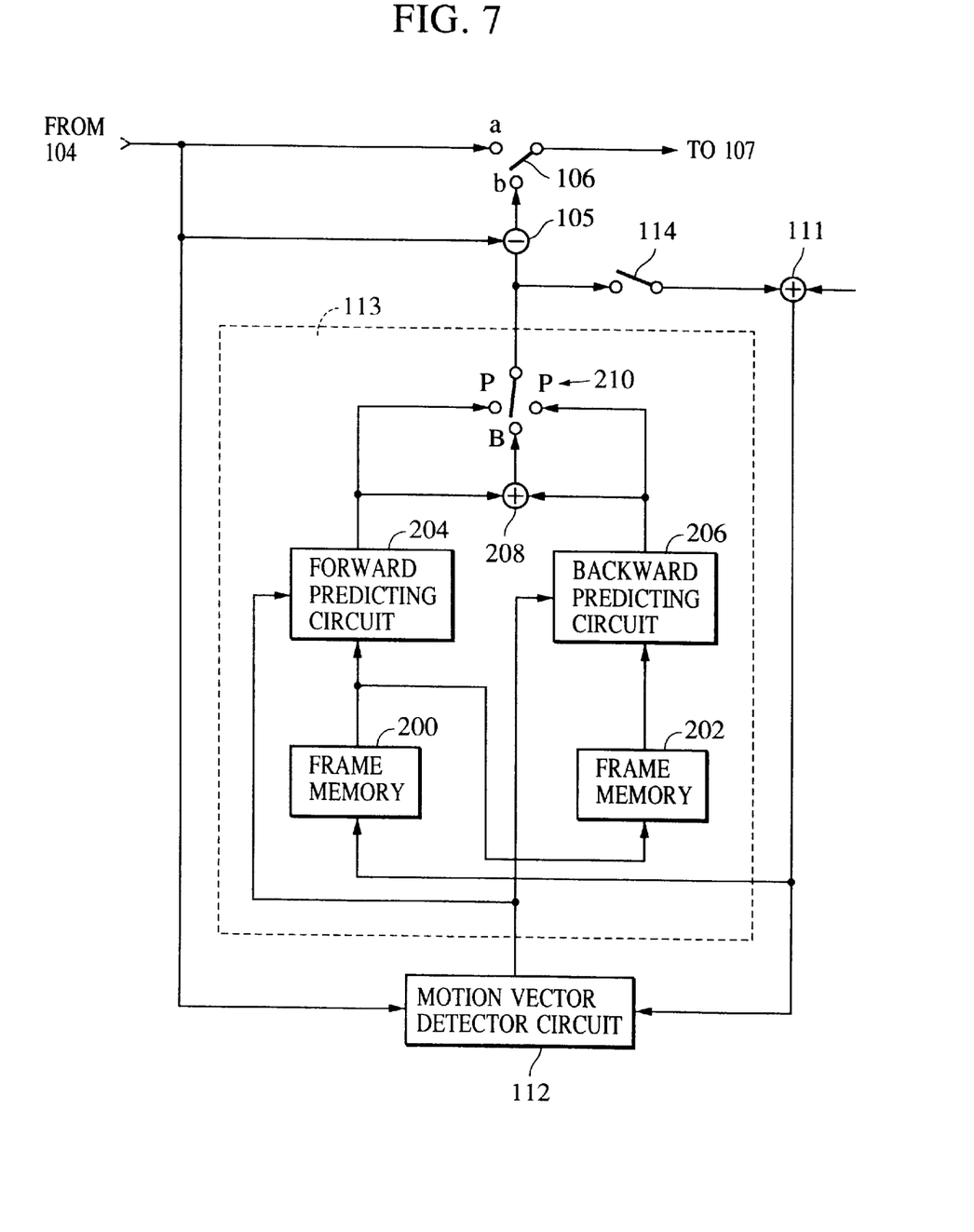
FIG. 7 is a detailed schematic diagram of a motion compensative frame prediction circuit 113.
Figure 8:
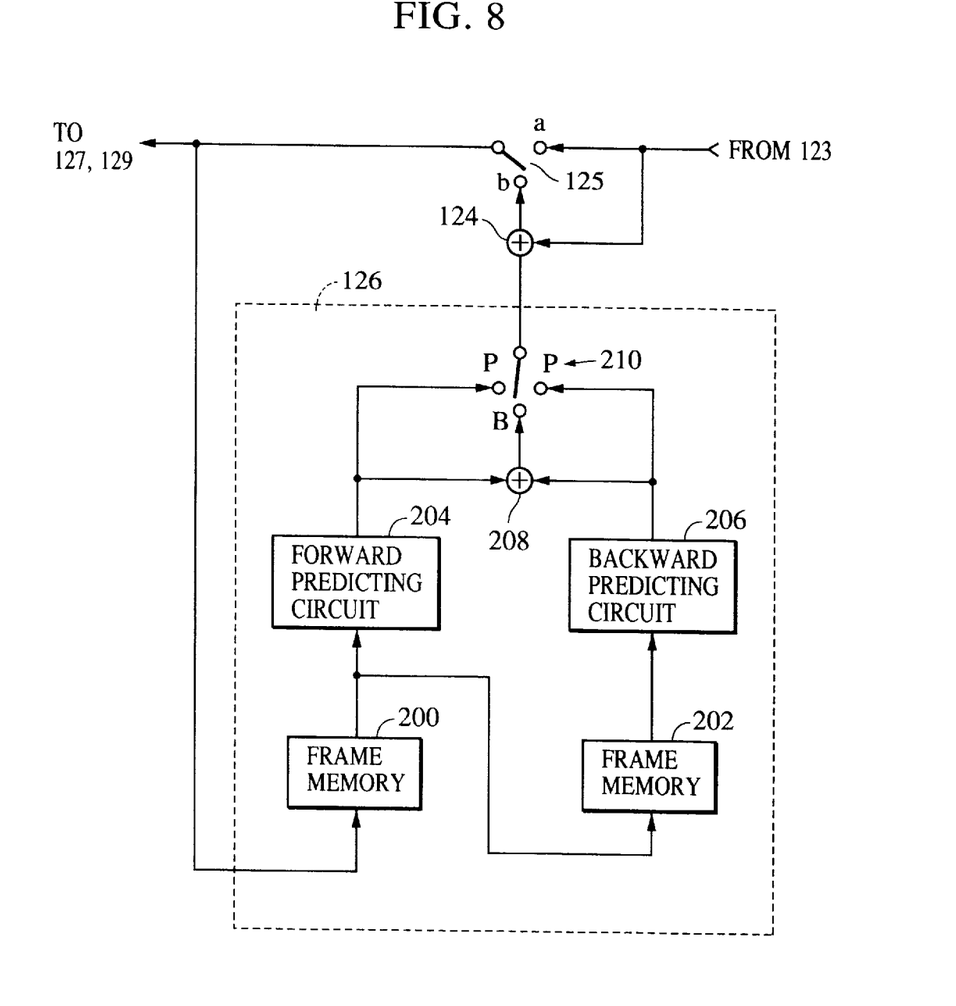
FIG. 8 is a detailed schematic diagram of a motion compensative frame prediction circuit 126.

FIG. 7 is a detailed schematic diagram of the motion compensative frame prediction circuit 113, and FIG. 8 is a detailed schematic diagram of the motion compensative frame prediction circuit 126.

Shown in FIGS. 7 and 8 are two frame memories 200, 202 in series connection, a forward predicting circuit 204, a backward predicting circuit 206, an adder 208 for summing the outputs of the forward predicting circuit 204 and backward predicting circuit 206, and a switch 210 for selecting one from the outputs of the forward predicting circuit 204, backward predicting circuit 206 and adder 208. Referring to FIG. 5, a motion vector detected by the motion vector detector circuit 112 is applied to both the forward predicting circuit 204 and backward predicting circuit 206. The forward predicting circuit 204 and backward predicting circuit 206 output motion-compensated predicted values in respective directions.

The switch 210 is controlled by the system control circuit 26 depending on which one of compression effect, image quality and special reproduction function has priority over the others.

The operation of the circuit arranged as shown in FIG. 5 is now discussed.

The coding process of the image data stored in the first memory 20 is first discussed. The coding process in accordance with the JPEG standard is performed in this embodiment.

The image data processed by the camera signal processor circuit 16 is fed to the input terminal 101. The image data received by the input terminal 101 is block segmented by the block segmentation circuit 102. The system control circuit 26 causes the switch 104 to make the connection to the contact point a.

Since the image data stored in the first memory 20 are all intra-frame coded data, the system control circuit 26 causes the switch 106 to make the connection to the contact point a and the switch 114 to break the connection. The output of the switch 104 is DCT transformed and quantized by the DCT circuit 107 and quantizing circuit 108, respectively.

The image data quantized by the quantizing circuit 108 is variable-length coded by the variable length coding circuit 115, and the intra-frame coded image data is thus presented at the output terminal 116.

The output of the quantizing circuit 108 is decoded by the inverse quantizing circuit 109 and inverse DCT circuit 110. The adder 111 adds the predicted value 0 to the output of the inverse DCT circuit 110.

The output of the adder 111 is a local decoded value. The motion vector detector circuit 112 detects a motion vector of the image from the current image data based on the output of the adder 111 and the output of the switch 104, and applies the detected motion vector to the motion compensative frame prediction circuit 113.

The motion compensative frame prediction circuit 113 stores the output of the adder 111 in the memories 200 and 202 in the order of the frame memories 200 and then 202, and outputs the motion compensative predicted value based on the motion vector detected by the motion vector detector circuit 112.

The coding process of the image data stored in the second memory 22 is now discussed.

The image data which is once intra-frame coded and then stored in the second memory 22 is decoded (as will be discussed later), and is then coded using inter-frame correlation. This embodiment uses the coding process in compliance with the MPEG standard.

The image data that is obtained by decoding the intra-frame coded image data is input to the input terminal 103. The system control circuit 26 causes each of the switches 104 and 106 to make the connection to the contact point b and the switch 114 to make the connection.

The subtracter 105 subtracts the motion compensative predicted value from the output of the switch 104 to output a predicted error. The predicted error is applied to the DCT circuit 107 via the switch 106, and is then DCT transformed and quantized by the DCT circuit 107 and quantizing circuit 108, respectively.

The image data quantized by the quantizing circuit 108 is variable-length coded by the variable length coding circuit 115, and the inter-frame coded image data is thus output at the output terminal 116.

The output of the quantizing circuit 108 is decoded by the inverse quantizing circuit 109 and inverse DCT circuit 110. The adder 111 adds the predicted value to the output of the inverse DCT circuit 110.

The output of the adder 111 is a local decoded value of the inter-frame coded data. The motion vector detector circuit 112 detects a motion vector of the image from the current image data based on the output of the adder 111 and the output of the switch 104, and applies the detected motion vector to the motion compensative frame prediction circuit 113.

The motion compensative frame prediction circuit 113 stores the output of the adder 111 in the memories 200 and 202 in the order of the frame memories 200 and then 202, and outputs the motion compensative predicted value based on the motion vector detected by the motion vector detector circuit 112.

The decoding process by the circuit arranged as shown in FIG. 6 is now discussed.

The coded image data is fed to the input terminal 120. The coded image data received at the input terminal 120 is variable-length decoded by the variable length decoding circuit 121, and its output is inverse-quantized and inverse-DCT transformed by the inverse quantizing circuit 122 and inverse DCT circuit 123, respectively.

The adder 124 adds a predicted value to the output of the inverse DCT circuit 123. The output of the inverse DCT circuit 123 is applied to the contact point a of the switch 125 while the output of the adder 124 is applied to the contact point b of the switch 125.

The switch 125, under the control of the system control circuit 26, makes the connection to the contact point a for an intra-frame coded picture and makes the connection to the contact point b for an inter-frame coded picture. The output from the switch 125 is reproduction image data that is properly processed as the intra-frame coded data or as the inter-frame coded data.

The motion compensative frame prediction circuit 126 outputs the motion compensative frame predicted value based on the output from the switch 125 in the same way as the motion compensative frame prediction circuit 113.

The block desegmentation circuit 127 returns the output of the switch 125 to raster scanning format data which is then output via the output terminal 128.

The output of the switch 125 is also output at the output terminal 129. The data output at the output terminal 129 is applied to the coding circuits shown in FIG. 5 via the input terminal 103.

As described above, image data is fast intra-frame coded and written onto the memory, and is then subjected to the coding using inter-frame correlation. The quantity of recorded data is thus reduced. A frame about which a still image taking request is made during the image taking is allowed to be individually decompressed and reproduced. With this arrangement, image information loss is precluded and a high-definition image results.

In the image processing apparatus of the above embodiments, the same circuit commonly serves as the circuit for the intra-frame coding and the circuit for the coding using the inter-frame correlation. Alternatively, two dedicated circuits may be employed. Although the circuit arrangement becomes bulky with the two circuits employed, the coding using the inter-frame correlation is executed in a parallel operation during the writing onto the first memory 20.

Since the coding process using the inter-frame correlation needs less real-time urgency, this coding process may be accomplished by software. In this case, the system control circuit 26 may perform the coding process using the inter-frame correlation. In this case as well, the coding using the inter-frame correlation is executed in a parallel operation during the writing onto the first memory 20.

In the above embodiments, the JPEG standard is used in the still image compression and the MPEG standard is used in the moving image compression. The present invention is not limited to these compression methods. For example, vector coding, fractal coding, or region splitting coding may be used. A first compression coding may be based on a coding method capable of decompressing within a single frame, and a second compression coding may be based on a coding method using the inter-frame correlation.

In other words, while the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims of to be accorded the broadest interpretation so as to encompass all such modifications and equivalent structures and functions.

What is claimed is:

1. An image processing apparatus comprising:

input means for inputting image data representing a plurality of successive pictures;

coding means for coding the image data by adaptively using an intra-picture coding and an inter-picture coding;

designating means for designating image data of a desired picture from the plurality of successive pictures; and control means for controlling said coding means so that the image data designated by said designating means is intra-picture coded.

2. An image processing apparatus according to claim 1, further comprising memory means for storing the image data coded by said coding means.

3. An image processing apparatus according to claim 1, wherein said input means comprises an imaging means for imaging an object.

4. An image processing apparatus according to claim 1, wherein said coding means once intra-picture codes the image data input by said input means, and then coding processes the intra-picture coded image data by using the inter-picture coding.

5. An image processing apparatus according to claim 1, wherein said coding means coding processes the image data designated by said designating means in accordance with the JPEG standard, and coding processes the remaining image data in accordance with the MPEG standard.

6. An image processing apparatus comprising:

input means for inputting image data representing a plurality of successive pictures;

coding means for coding the image data by adaptively using a plurality of different coding types, the plurality of coding types including at least intra-picture coding;

designating means for designating image data of a desired picture from the plurality of successive pictures; and control means for controlling said coding means so that the image data designated by said designating means is intra-picture coded.

7. An image processing apparatus according to claim 6, wherein said coding means once intra-picture codes the image data input by said input means, and then coding processes the intra-picture coded image data by using the inter-picture coding.

8. An image processing apparatus according to claim 6, wherein said coding means coding processes the image data designated by said designating means in accordance with the JPEG standard, and coding processes the remaining image data in accordance with the MPEG standard.

9. An image processing apparatus according to claim 6, wherein said input means includes imaging means for imaging an object.

10. An image processing apparatus according to claim 6, wherein the intra-picture coding is a coding of JPEG standard.

11. An image processing apparatus according to claim 6, further comprising recording means for recording the image data coded by said coding means onto a recording medium.

12. An image processing apparatus according to claim 6, wherein the plurality of coding types includes a coding of JPEG standard and a coding of MPEG standard.

13. An image processing method comprising te steps of:

inputting image data representing a plurality of successive pictures;

coding the image data by adaptively using an intra-picture coding and an inter-picture coding;

designating image data of a desired picture from the plurality of successive pictures; and controlling the coding of said coding step so that the image data designated in said designating step is intra-picture coded.

14. An image processing method comprising the steps of:

inputting image data representing a plurality of successive pictures;

coding the image data by adaptively using a plurality of different coding types, the plurality of coding types including at least intra-picture coding;

designating image data of a desired picture from the plurality of successive pictures; and controlling the coding of said coding step so that the image data designated in said designating step is intra-picture coded.

* * * * *

UNITED STATES PATENT AND TRADEMARK OFFICE
CERTIFICATE OF CORRECTION

| | |
|---|---|
| PATENT NO. | : 6,148,031 |
| DATED | : November 14, 2000 |
| INVENTOR(S) | : Kato |

It is certified that error appears in the above-identified patent and that said Letters Patent is hereby corrected as shown below:

Column 4,
Line 13, "TELEVICION" should read -- TELEVISION --.

Column 10,
Line 36, "te" should read -- the --.

Signed and Sealed this

Twenty-fifth Day of September, 2001

Attest:

NICHOLAS P. GODICI
Attesting Officer
Acting Director of the United States Patent and Trademark Office